US012579657B2

(12) United States Patent
Schlaudraff

(10) Patent No.: US 12,579,657 B2
(45) Date of Patent: Mar. 17, 2026

(54) IMAGING DEVICE AND METHOD

(71) Applicant: Leica Microsystems CMS GmbH, Wetzlar (DE)

(72) Inventor: Falk Schlaudraff, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 454 days.

(21) Appl. No.: 18/346,881

(22) Filed: Jul. 5, 2023

(65) Prior Publication Data

US 2024/0037755 A1     Feb. 1, 2024

(30) Foreign Application Priority Data

Jul. 26, 2022     (EP) ..................................... 22186898

(51) Int. Cl.
    *G06T 7/174*          (2017.01)
    *G01N 21/64*          (2006.01)
    (Continued)

(52) U.S. Cl.
    CPC ......... *G06T 7/174* (2017.01); *G01N 21/6458* (2013.01); *G06T 7/11* (2017.01);
    (Continued)

(58) Field of Classification Search
    CPC . G06T 7/174; G06T 7/11; G06T 11/00; G06T 2207/10056; G06T 2207/10064; G06T 2207/10152; G06T 7/136; G06T 2207/30024; G06T 11/001; G01N 21/6458; G01N 21/6428; G01N 2021/6439; G01N 2021/6463
See application file for complete search history.

(56) References Cited

U.S. PATENT DOCUMENTS

| | | | | |
|---|---|---|---|---|
| 10,824,847 B2 * | 11/2020 | Wu | ......................... | G06V 10/82 |
| 11,022,539 B2 * | 6/2021 | Pedersen | ............ | G01N 15/1433 |

(Continued)

OTHER PUBLICATIONS

"The Colored Revolution of Bioimaging"; C. Vonesch, IEEE Signal Processing Magazine (vol. 23, Issue: 3, 2006, pp. 20-31) (Year: 2006).*

(Continued)

*Primary Examiner* — Michael S Osinski
(74) *Attorney, Agent, or Firm* — LEYDIG, VOIT & MAYER, LTD.

(57)          ABSTRACT

An imaging device for imaging a sample includes an excitation unit configured to emit excitation light for exciting a first fluorophore attached to a first feature of the sample and at least a second feature of the sample, and a detection unit configured to receive fluorescence light from the first fluorophore, and generate at least one fluorescence image from the received fluorescence light. The imaging device further includes a controller configured to determine, based on an image segmentation, a first image region of the fluorescence image corresponding to the first feature and a second image region of the fluorescence image corresponding to the second feature, generate a first image based on the first image region and a second image based on the second image region, and/or generate a composite image comprising at least the first image region and the second image region.

15 Claims, 7 Drawing Sheets

(51) Int. Cl.
  *G06T 7/11* (2017.01)
  *G06T 11/00* (2006.01)
(52) U.S. Cl.
  CPC .... *G06T 11/00* (2013.01); *G06T 2207/10056*
    (2013.01); *G06T 2207/10064* (2013.01); *G06T*
    *2207/10152* (2013.01)

(56) References Cited

U.S. PATENT DOCUMENTS

| | | | | |
|---|---|---|---|---|
| 12,092,576 | B2 * | 9/2024 | Boppart | G01N 15/1434 |
| 12,392,723 | B2 * | 8/2025 | Gerlach | G06T 7/0012 |
| 2011/0183370 | A1 * | 7/2011 | Noiseux | G01N 33/582 |
| | | | | 435/288.7 |
| 2016/0314594 | A1 * | 10/2016 | Vink | G06T 5/40 |
| 2017/0370847 | A1 * | 12/2017 | Ghadiali | G01N 15/1433 |
| 2018/0017568 | A1 * | 1/2018 | Masubuchi | C12Q 1/68 |
| 2018/0286040 | A1 * | 10/2018 | Sashida | G06V 20/698 |
| 2019/0049379 | A1 * | 2/2019 | Konishi | G01N 15/1433 |
| 2019/0156481 | A1 * | 5/2019 | Sekiguchi | G06V 10/44 |
| 2019/0162666 | A1 * | 5/2019 | Akasaka | G01N 15/1459 |
| 2020/0132603 | A1 * | 4/2020 | Sugiyama | G01J 3/4406 |
| 2020/0158719 | A1 * | 5/2020 | Akiyoshi | G01N 21/6428 |
| 2020/0184192 | A1 * | 6/2020 | Tominaga | G06V 10/46 |
| 2020/0249165 | A1 * | 8/2020 | Matsumoto | G02B 21/0076 |
| 2021/0199582 | A1 * | 7/2021 | Fereidouni | G01N 21/6428 |
| 2021/0199585 | A1 * | 7/2021 | Tatsuta | G01N 21/6458 |
| 2021/0224992 | A1 * | 7/2021 | Mizukami | G06T 7/0014 |
| 2022/0207725 | A1 * | 6/2022 | Kuwano | G06V 10/56 |

| | | | | |
|---|---|---|---|---|
| 2022/0228987 | A1 * | 7/2022 | Boppart | G01N 15/1459 |
| 2023/0058796 | A1 * | 2/2023 | Inazawa | G01N 21/6458 |
| 2023/0273188 | A1 * | 8/2023 | Luo | G06T 7/33 |
| | | | | 435/29 |
| 2023/0296520 | A1 * | 9/2023 | Harke | G02B 21/367 |
| | | | | 250/459.1 |
| 2023/0298184 | A1 * | 9/2023 | Taruttis | G06T 5/92 |
| | | | | 382/131 |
| 2023/0351602 | A1 * | 11/2023 | Blanchard | G06T 7/11 |
| 2023/0384223 | A1 * | 11/2023 | Harke | G02B 21/0076 |
| 2023/0384224 | A1 * | 11/2023 | Donnert | G02B 21/0076 |
| 2024/0050033 | A1 * | 2/2024 | Ruggeri | A61B 3/085 |
| 2024/0069020 | A1 * | 2/2024 | Smith | B01L 3/502761 |
| 2024/0102932 | A1 * | 3/2024 | Lim | G06V 10/25 |
| 2024/0133869 | A1 * | 4/2024 | Deben | C12N 15/62 |
| 2024/0169534 | A1 * | 5/2024 | Enoki | G06T 7/0012 |
| 2024/0369484 | A1 * | 11/2024 | Brill | G01N 21/6428 |
| 2025/0028159 | A1 * | 1/2025 | Zheng | G02B 23/26 |
| 2025/0139772 | A1 * | 5/2025 | Ikeda | G06T 5/70 |

OTHER PUBLICATIONS

Thomas Niehörster et al.: "Multi-target spectrally resolved fluorescence lifetime imaging microscopy," Nature Methods, vol. 13 No. 3, Mar. 2016, pp. 1-9, Nature America, Inc., US.
Kenneth R. Castleman et al.: "Fish Image Analysis," IEEE Engineering in Medicine and Biology, Jan./Feb. 1996, pp. 1-10, IEEE, US.

* cited by examiner

IMAGING DEVICE AND METHOD

CROSS REFERENCE TO RELATED APPLICATIONS

This application claims benefit to European Patent Application No. EP 22186898.7, filed on Jul. 26, 2022, which is hereby incorporated by reference herein.

FIELD

Embodiments of the present invention relate to an imaging device, to a method for imaging a sample, and to a computer program product.

BACKGROUND

In fluorescence microscopy fluorophores are used to mark features of a sample, for example cell walls and cell nuclei. Fluorophores can be excited by excitation light, typically light of a specific wavelength, to emit fluorescence light. This fluorescence light may be used to generate an image of the sample. Marking a feature in a sample with fluorophores thereby makes this feature visible to fluorescence imaging. Typically, each feature of the sample is marked with a different fluorophore in order to distinguish it. For example, all cell walls in the sample are marked with one fluorophore, and all cell nuclei are marked with a different fluorophore. Different fluorophores have different emission characteristics by which the fluorophores, and by extension the features the fluorophores are attached to, can be identified.

Typically, the different fluorophores are imaged sequentially. This means that each of the different fluorophores is excited and imaged individually in a separate imaging step. However, sequential imaging is time consuming and causes stress to the sample due to repeated light exposure. Another way to distinguish the different fluorophores is to separate the fluorescence light emitted by the sample into different spectral channels, each spectral channel comprising a different wavelength band. However, this does not reduce the stress to the sample, since each of the different fluorophores still has to be excited individually.

SUMMARY

Embodiments of the present invention provide an imaging device for imaging a sample. The imaging device includes an excitation unit configured to emit excitation light for exciting a first fluorophore attached to a first feature of the sample and at least a second feature of the sample, and a detection unit configured to receive fluorescence light from the first fluorophore, and generate at least one fluorescence image from the received fluorescence light. The imaging device further includes a controller configured to determine, based on an image segmentation, a first image region of the fluorescence image corresponding to the first feature and a second image region of the fluorescence image corresponding to the second feature, generate a first image based on the first image region and a second image based on the second image region, and/or generate a composite image comprising at least the first image region and the second image region.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following:

FIG. 4 is a schematic view of a first image region of the first fluorescence image according to FIG. 3;

FIG. 6 is a schematic view of a second fluorescence image generated by the imaging device according to FIG. 1.

DETAILED DESCRIPTION

Figure 1:
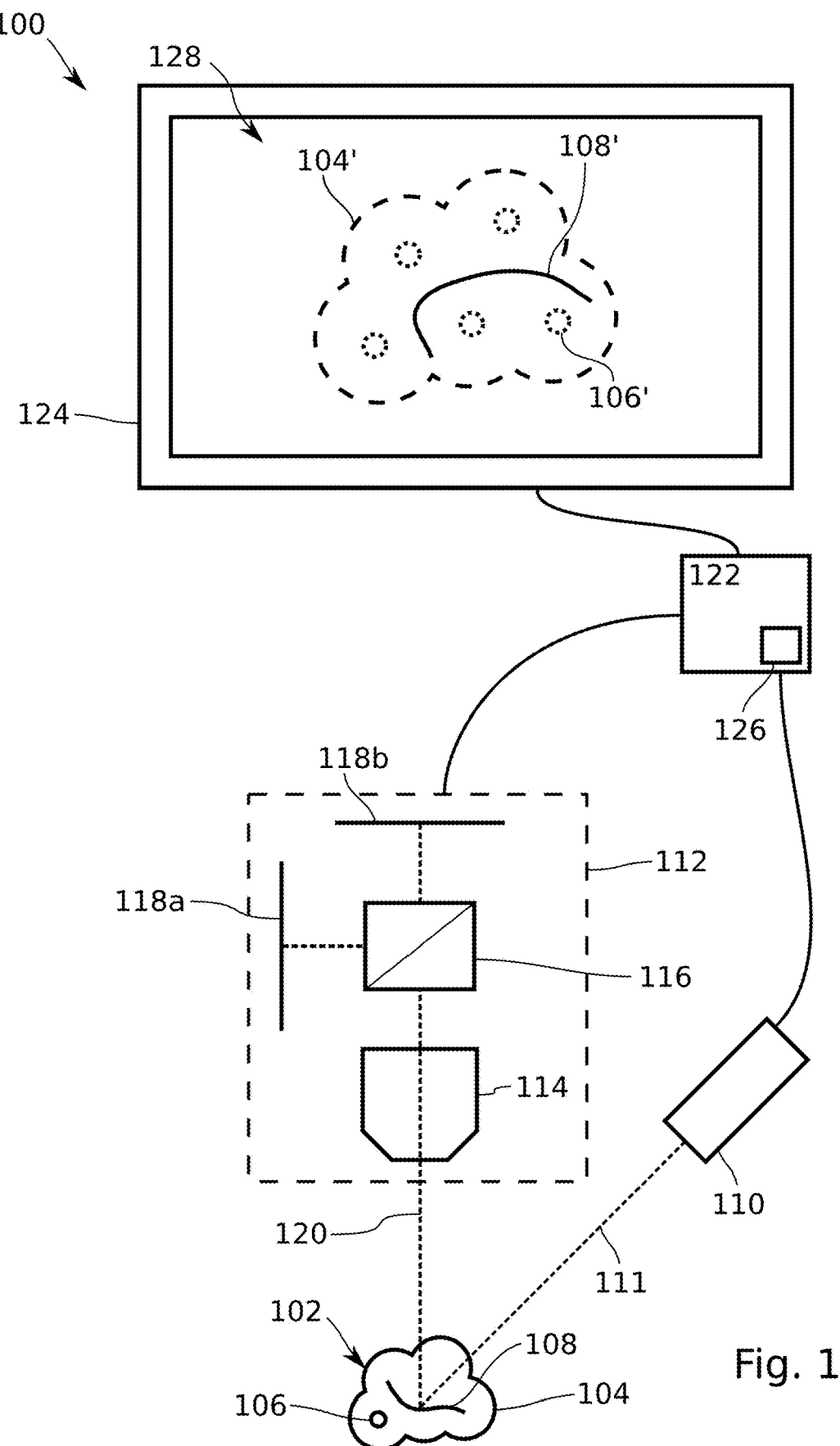
FIG. 1 is a schematic view of an imaging device according to an embodiment.

Embodiments of the present invention provide an imaging device and a method for imaging a sample that allow the fluorescence imaging of a sample that is faster and causes less stress to the sample.

According to some embodiments, an imaging device for imaging a sample comprises an excitation unit configured to emit excitation light for exciting a fluorophore attached to a first feature of the sample and at least one second feature of the sample. A detection unit of the imaging device is configured to receive fluorescence light from the excited fluorophore, and to generate at least one fluorescence image from the received fluorescence light. The imaging device further comprises a controller. The controller is configured to determine based on an image segmentation a first image region of the fluorescence image corresponding to the first feature and a second image region of the fluorescence image corresponding to the second feature, to generate a first image based on the first image region and a second image based on the second image region, and/or to generate a composite image comprising at least the first image region and the second image region.

The imaging device is configured to image the first feature and the second feature by means of fluorescence imaging. To image the first feature and the second feature, the first feature and the second are first marked with the same fluorophore. The fluorophore is then excited with the excitation light to emit fluorescence light. The fluorescence light is received by the detection unit, and the detection unit generates the fluorescence image. The fluorescence image comprises both the first feature and the second feature. To distinguish the first feature and the second feature, the image segmentation is performed. Based on the image segmentation, the controller determines the first image region corresponding to the first feature, and the second image region corresponding to the second feature. The controller then generates the first image comprising the first feature and the second image comprising the second feature. Alternatively, or additionally, the controller generates the composite image comprising both the first feature and the second feature. With the proposed imaging device, the first feature and the second feature are imaged in a single imaging step. This is considerably faster than imaging the first feature and the second feature consecutively. Further, the sample is illuminated only once with the excitation light, resulting in less light exposure and less stress to the sample.

The imaging device may be configured to image additional features of the sample. Some of the additional features may also be marked with the same fluorophore as the first feature and the second feature. For each additional feature marked with the same fluorophore, the controller is configured to determine an additional image region corresponding to the additional feature based on the image segmentation.

According to an embodiment, the controller is configured to perform the image segmentation based on a prior knowledge of the first feature and/or the second feature. In this embodiment, the features of the sample are identified by known properties. For example, the features may be identified by their shape, size and/or structure. The features may also be identified by the intensity of the emitted fluorescence light, since some biological structures influence the emission characteristics of the fluorophore. In particular, the controller is configured to perform the image segmentation using a database comprising known properties of at least the first feature and the second feature. Preferably, the controller is configured to perform the image segmentation not using machine learning. Performing the image segmentation based on known properties is considerably faster and less computationally intensive than other methods of image segmentation.

According to another embodiment, the detection unit is configured to detect a plurality of fluorescence emission signals from the received fluorescence light. The controller may be configured to perform the image segmentation by assigning each of the fluorescence emission signals selectively to the first image region associated with the first feature or the second image region associated with the second feature. The fluorescence emission signals each correspond to a plurality of photons of the received fluorescence light originating from the same vicinity of the sample. The fluorescence image may be generated by combining the fluorescence emission signals. In this embodiment, the first image region and the second image region each comprise a part of the plurality of fluorescence emission signals. The image segmentation is performed by identifying which fluorescence emission signal corresponds to fluorescence light emitted from the first structure and which fluorescence emission signal corresponds to fluorescence light emitted from the second structure. This identification may in particular be based on which of the image regions neighboring fluorescence emission signals correspond to. This identification may also be based on an emission characteristic of the fluorescence light, for example an intensity.

According to another embodiment, the fluorescence image comprises pixels. Each pixel may correspond to one or more of the fluorescence emission signals. The controller may be configured to determine based on the image segmentation the pixels of the fluorescence image corresponding to the first image region, and the pixels of the fluorescence image corresponding to the second image region. In this embodiment, the first image region and the second image region each comprise a collection of pixels of the fluorescence image. Since each pixel may correspond to more than one fluorescence emission signal, some of the pixels may be part of both the first image region and the second image region. In such a case, the controller may determine that the pixel in question is assigned to either the first image region or the second image region. The assignment may be based on for example an intensity or a photon count of the fluorescence emission signals. The assignment may also be based on which of the image regions the neighboring pixels correspond to. Pixel are a simple way of storing image data in an easily retrievable manner. However, alternatives exist. For example, the fluorescence image may also be a volumetric image comprising voxel or a point cloud, wherein each voxel or each point of the pint cloud corresponds to one or more of the fluorescence emission signals.

According to another embodiment, the first image and the second image are false color images. The first image has first color and the second image has second color, the second color being different from the first color. In this embodiment, the first image and the second image are provided in different colors. This helps the user distinguish the first feature and the second feature, thereby making the imaging device easier to use.

According to another embodiment, the composite image is a false color image. The first image region in the composite image has the first color, and the second image region in the composite image has the second color. The first feature has the first color in the composite image while the second feature has the second color in the composite image. This helps the user distinguish the first feature and the second feature in the composite image, thereby making the imaging device easier to use.

According to another embodiment, the excitation unit is configured to emit second excitation light for exciting a second fluorophore attached to a third feature of the sample. The detection unit is configured to separate the received fluorescence light into at least two spectral channels, a first spectral channel corresponding to a first wavelength band comprising at least a part of the emission spectrum of the first fluorophore, and a second spectral channel corresponding to a second wavelength band comprising at least a part of the emission spectrum of the second fluorophore. The detection unit is further configured to generate the first fluorescence image based on the fluorescence light received in the first spectral channel, and to generate a second fluorescence image based on the fluorescence light received in the second spectral channel. Preferably, the first wavelength band and the second wavelength band do not overlap.

In this embodiment, the imaging device is configured to also image the third feature by means of fluorescence imaging. While the first feature and the second are marked with the same first fluorophore, the third feature is marked with the second fluorophore that is different from the first fluorophore. The two fluorophores are then excited by the excitation unit to emit fluorescence light. The fluorescence light is received by the detection unit and separated into the first spectral channel and the second spectral channel. The first fluorescence image is generated based on the first spectral channel and comprises the first feature and the second feature. The second fluorescence image is generated based on the second spectral channel and comprises the third feature. From the first fluorescence image and based on the image segmentation, the first image region and the second image region are determined. This allows the first feature and the second feature to be distinguished although they are imaged in the same spectral channel. Preferably, no image segmentation is performed for the second channel. The first image region and the second image region form two virtual spectral channels, so to speak. Thereby, the imaging device makes optimal use of the available spectral channels. Although the sample is illuminated twice, the light is exposure is still lower than had the first feature and the second feature been marked with different fluorophore, since the two different fluorophores would have had to be excited by different excitation lights.

The imaging device according to the present embodiment may in particular be used to observe the third feature in the second spectral channel using the first feature and the second feature as a backdrop. For example, when the user is observing a sample, many features of the sample are already known and of little interest, for example cell walls, cell nuclei, and certain organelles. However, these known features, i.e. the first feature and the second feature, may serve as the backdrop against which a feature of interest, i.e. the third feature, may be observed. This allows the features of interest to be easily located within the sample.

According to another embodiment, the optical detection unit comprises at least two detector elements and a beam splitter that is configured to direct received fluorescence light having a wavelength in the first wavelength band onto a first detector element, and to direct received light having a wavelength in the second wavelength band onto a second detector element. In this embodiment, the beam splitter, the first detector element, and the second detector element are used as means for generating the first spectral channel and the second spectral channel. Compared to other means for generating the first and second spectral channels, using the beam splitting element and the first and second detector elements is easy to implement, cost-effective, and reliable.

According to another embodiment, the controller is configured to generate a or the composite image comprising at least the first image region, the second image region, and based on the second fluorescence image. The first image region has the first color, the second image region has the second color, and the second fluorescence image has a third color, the third color being different from the first color and the second color. Each of the features is presented in a different color in the composite image. This helps the user distinguish the different features in the composite image, thereby making the imaging device easier to use.

According to another embodiment, the controller is configured to determine a background region of the fluorescence image based on at least the first image region and the second image region, and to remove the background region from the first image, the second image, the composite image, the first fluorescence image and/or the second fluorescence image. The background region may be a region of the sample that is of less interest to the user. The background region may also be a region in the first fluorescence image and/or the second fluorescence image that comprises predominantly noise. In this embodiment, the background region is removed based on the first feature and the second feature. In particular, the controller removes all fluorescence emission signals or pixels that do not correspond to either the first feature or the second feature. For example, certain polymers used as a substrate for mounting samples emit fluorescence light in the same wavelength region as certain fluorophores. For example, polyethylene naphthalate (PEN) foils are used as a substrate for laser microdissection. However, PEN emits fluorescence light in the same wavelength region as DAPI when using illumination light having a wavelength of 365 nm. By identifying the first feature and the second feature stained with DAPI in the first fluorescence image and removing the background, the contribution of the autofluorescence of the PEN substrate to the first fluorescence image is removed. Thereby, the imaging device allows the use of certain polymer substrates in fluorescence imaging, making the imaging device even more versatile. Overall, removing the background region results in a less cluttered and clearer image.

According to another embodiment, the imaging device is a microscope. Preferably, the optical detection unit comprises at least one microscope objective that is directed at the target area, and configured to receive the fluorescence light from the sample. A microscope provides magnification allowing the user to see small details of the sample that would not be visible to the unaided eye. However, the imaging device is not limited to be a microscope. For example, the imaging device may also be a slide scanner, a light-sheet system, a flow cytometer, or any other imaging device suitable for fluorescence imaging.

Embodiments of the present invention also relate to a method for imaging a sample. The method comprises the following steps: Exciting a fluorophore attached to a first feature of the sample and at least one second feature of the sample. Receiving fluorescence light from the excited fluorophores, and generating at least one fluorescence image from the received fluorescence light. Determining based on an image segmentation a first image region of the fluorescence image corresponding to the first feature and a second image region of the fluorescence image corresponding to the second feature. Generating a first image based on the first image region and a second image based the second image region, and/or generating a composite image comprising at least the first image region and the second image region.

The method has the same advantages as the imaging device described above and can be supplemented using the features of the dependent claims directed at the imaging device.

According to an embodiment, the method comprises the following additional steps: Staining the first feature and the second feature with the first fluorophore, and staining a third feature with a second fluorophore. Separating the received fluorescence light into at least two spectral channels, a first spectral channel corresponding to a first wavelength band comprising at least a part of the emission spectrum of the first fluorophore, and a second spectral channel corresponding to a second wavelength band comprising at least a part of the emission spectrum of the second fluorophore. Generating the first fluorescence image based on the fluorescence light received in the first spectral channel, and generating a second fluorescence image based on the fluorescence light received in the second spectral channel. Preferably, no image segmentation is performed for the second channel. The first image region and the second image region form two virtual spectral channels, thereby increasing the number of available spectral channels. In this embodiment, optimal use is made of the available spectral channels.

According to another embodiment, the method is part of an experiment wherein possible changes in the first feature and second feature have a lower relevance for the experiment than changes in the third feature. In this embodiment the third feature is observed in the second spectral channel using the first feature and the second feature as a backdrop. For example, the first features and the second feature may already be known and/or of little interest to the experiment. However, the first feature and the second feature may still be used as the backdrop against which a feature of interest, i.e. the third feature, is observed. The first feature and the second feature thereby provide a road map, so to speak, allowing the third feature to be easily located within the sample.

Embodiments of the present invention further relate to a computer program product comprising a program code configured to perform the method described above, when the computer program product is run on a processor.

The computer program product has the same advantages as the imaging device and the method described above, and can be supplemented using the features of the dependent claims directed at the imaging device and the method for controlling an imaging device, respectively.

FIG. 1 is a schematic view of an imaging device 100 for imaging a sample 102 according to an embodiment.

The sample 102 is exemplary shown as a biological sample. The sample 102 may in particular be a tissue section, such as a liver or brain section. A first fluorophore is attached to a first feature 104 of the sample 102 and to a second feature 106 of the sample 102. In FIG. 1, the first feature 104 is exemplary chosen to be cell walls, and the second feature 106 is exemplary chosen to be cell nuclei. A second fluorophore is attached to a third feature 108 of the sample 102.

The imaging device 100 comprises an excitation unit 110 configured to emit excitation light 111. In particular, the excitation unit 110 is configured to emit first excitation light to excite the first fluorophore, and to emit second excitation light to excite the second fluorophore. In FIG. 1, the first and second excitation light are denoted by the same reference sign 111 for clarity. The excitation unit 110 may in particular comprise one or more laser light sources for generating the excitation light 111. For example, one laser light source each may be provided for the first and second excitation light 111. Alternatively, a single broadband laser light source configured to generate broadband laser light may be provided. The first and second excitation light 111 may then be generated from the broadband laser light, for example by means of filters, in particular by means of an acousto optic tunable filter (AOTF). The excitation unit 110 may further comprise optical elements configured to direct the first and second excitation light 111 onto the sample 102. In particular, the excitation unit 110 may comprise a scanning unit configured to selectively direct the first and second excitation light 111 onto different regions of the sample 102.

A detection unit 112 of the imaging device 100 comprises a microscope objective 114, a beam splitter 116, a first detector element 118a, and a second detector element 118b. The microscope objective 114 is directed at the sample 102 and configured to receive fluorescence light 120 from the excited fluorophores, and to direct the fluorescence light 120 into the beam splitter 116. The beam splitter 116 is exemplary formed as a dichroic beam splitter. The beam splitter 116 is configured to direct fluorescence light 120 having a wavelength in a first wavelength band onto the first detector element 118a, and to direct fluorescence light 120 having a wavelength in a second wavelength band onto the second detector element 118b. The first wavelength band comprises at least part of the emission spectrum of the first fluorophore. Preferably, the first wavelength band comprises the emission maximum of the first fluorophore. Likewise, the second wavelength band comprises at least part of the emission spectrum of the second fluorophore. Preferably, the second wavelength band comprises the emission maximum of the second fluorophore. By dividing the fluorescence light 120 between the first detector element 118a and the second detector element 118b, two spectral channels are formed. More spectral channels may be easily formed by providing more beam splitters and detector elements.

Since the majority of the fluorescence light 120 emitted by the first fluorophore is captured by the first detector element 118a, the first feature 104 and the second feature 106 are imaged by the first detector element 118a. Likewise, the majority of the fluorescence light 120 emitted by the second fluorophore is captured by the second detector element 118b, and the third feature 108 is imaged by the second detector element 118b. In other words, the first feature 104 and the second feature 106 are imaged in a first spectral channel, and the third feature 108 is imaged in a second spectral channel.

Figure 3:
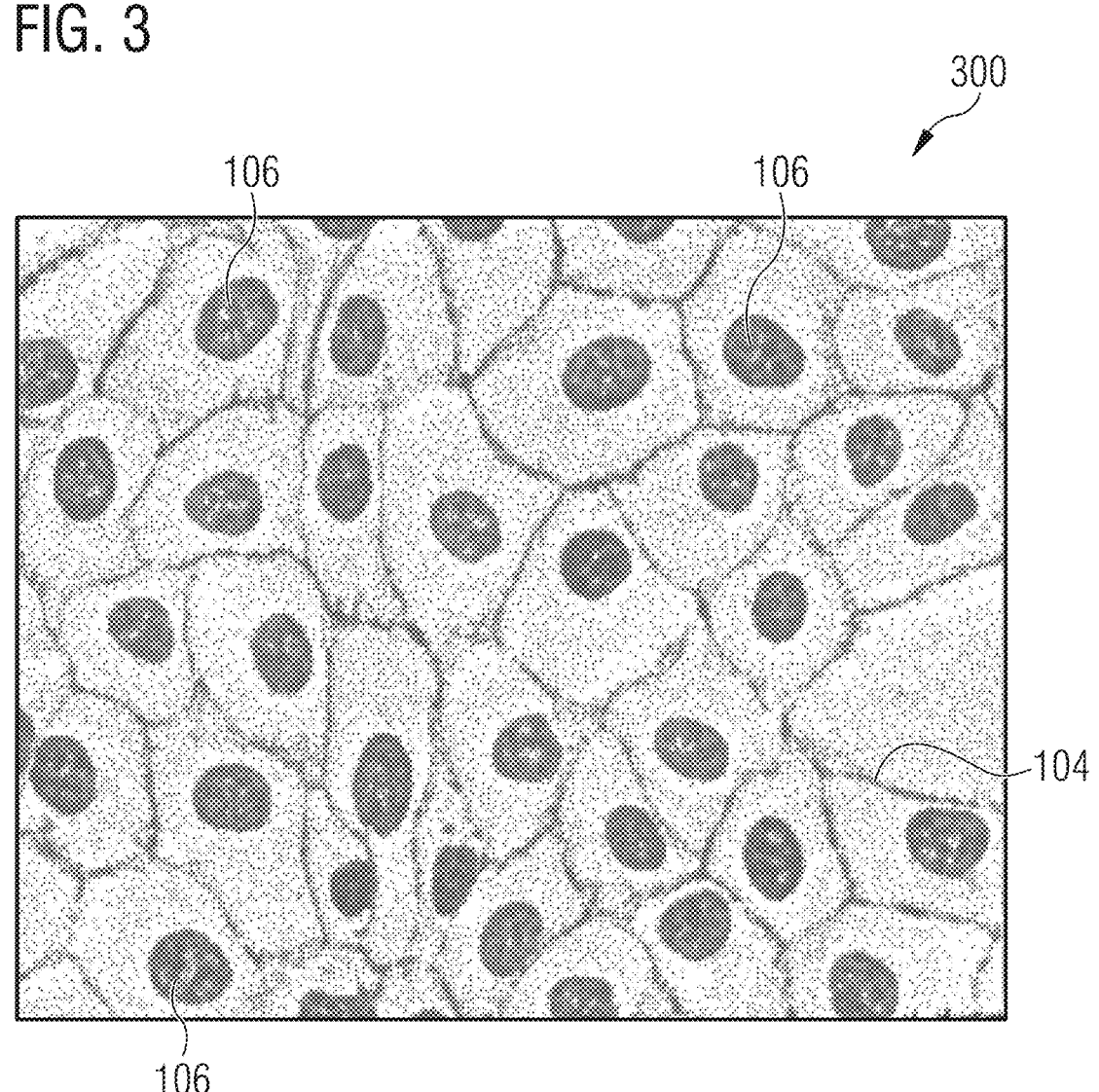
FIG. 3 is a schematic view of a first fluorescence image generated by the imaging device according to FIG. 1.
Figure 6:
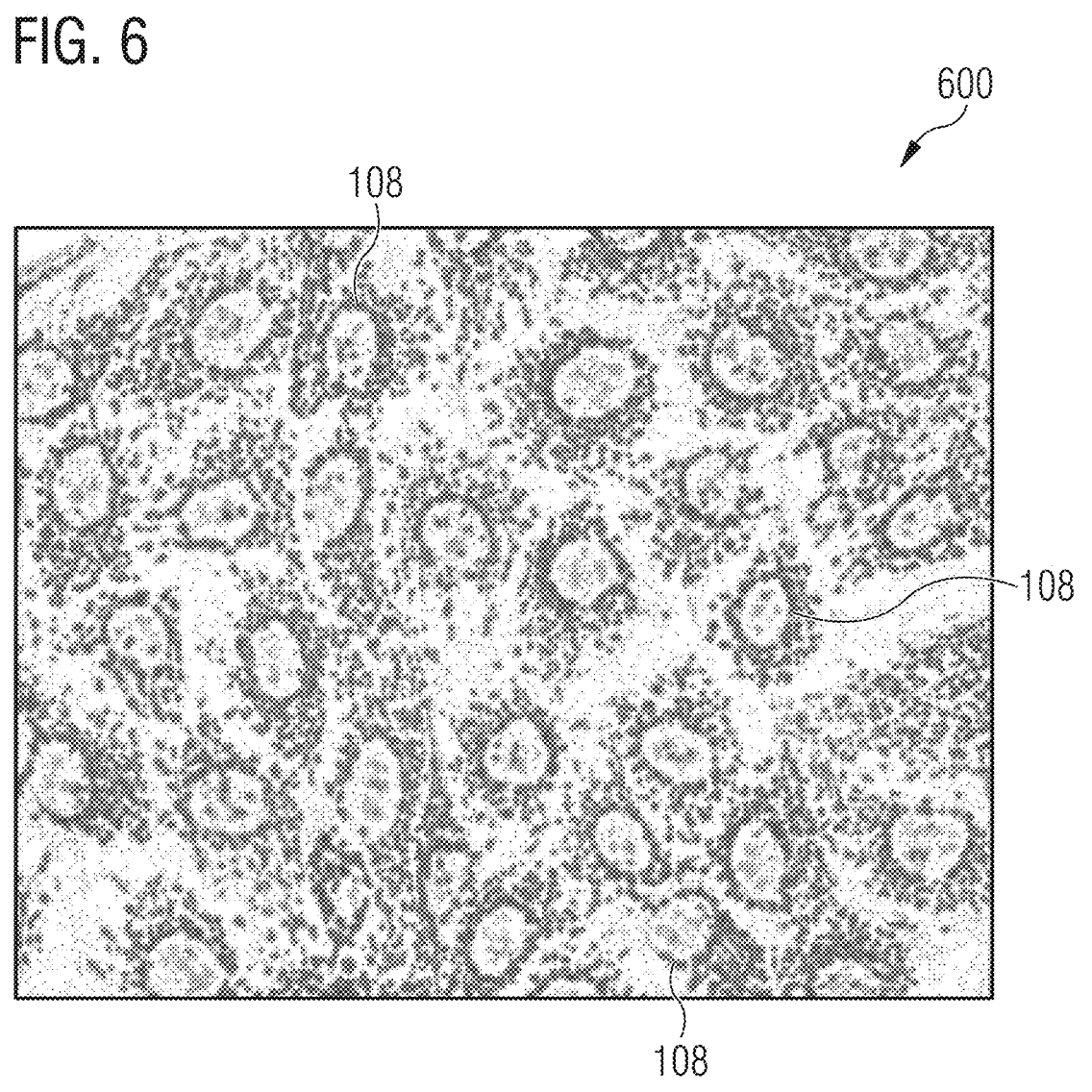

The fluorescence light 120 detected by the first detector element 118a and the second detector element 118b is converted into fluorescence emission signals. Each fluorescence emission signal corresponds to one or more photons of the fluorescence light 120. The detection unit 112 forms a first fluorescence image 300 (c.f. FIG. 3) from the fluorescence emission signals generated by the first detector element 118a, and a second fluorescence image 600 (c.f. FIG. 6) from the fluorescence emission signals generated by the second detector element 118b. The first fluorescence image 300 comprises the first feature 104 and the second feature 106. The second fluorescence image 600 comprises the third feature 108. The first and second fluorescence images 600 are in particular monochrome images. In the present embodiment, the first fluorescence image 300 and the second fluorescence image 600 comprise pixels, each pixel corresponding to one or more of the fluorescence emission signals. The first fluorescence image 300 and the second fluorescence image 600 are described below in more detail with reference to FIG. 3 and FIG. 6, respectively.

In the present embodiment, the imaging device 100 is exemplary formed as a microscope, more specifically as a widefield microscope configured to image the entire observed area of the sample 102 simultaneously. The imaging device 100 may also be formed as a scanning microscope configured to scan observed area of the sample 102 in successive imaging steps. In particular, the imaging device 100 may be formed as a confocal microscope. However, the imaging device 100 is not limited to be a microscope.

In FIG. 1, the beam path of the excitation light 111 and the beam path of the fluorescence light 120 do not overlap. However, the imaging device 100 may be configured such that the beam path of the excitation light 111 and the beam path of the fluorescence light 120 coincide at least partially. For example, the excitation light 111 may be directed through the microscope objective 114 onto the sample.

The imaging device 100 further comprises a controller 122 and an output unit 124. The controller 122 comprises a memory element 126, and is configured to control the excitation unit 110, the detection unit 112, and the output unit 124. The controller 122 is further configured to perform a method for imaging the sample 102. The method in particular involves the controller 122 determining a first image region 104' in the first fluorescence image 300 corresponding to the first feature 104, and a second image region 106' in the first fluorescence image 300 corresponding to the second feature 106. The method is described in more detail below with reference to FIGS. 2 to 7.

In FIG. 1, the output unit 124 exemplary display a composite image 128 generated by the controller 122 based on the first image region 104', the second image region 106', and the second fluorescence image 600. The first image region 104' corresponds to the first feature 104, i.e. the cell walls of the sample 102, and is shown as a dashed line in FIG. 1. The second image region 106' corresponds to the second feature 106, i.e. the cell nuclei of the sample 102, and is shown as a dotted line in FIG. 1. The third feature 108 is exemplary a filament of the sample 102, and is shown as a solid line in FIG. 1.

Figure 2:
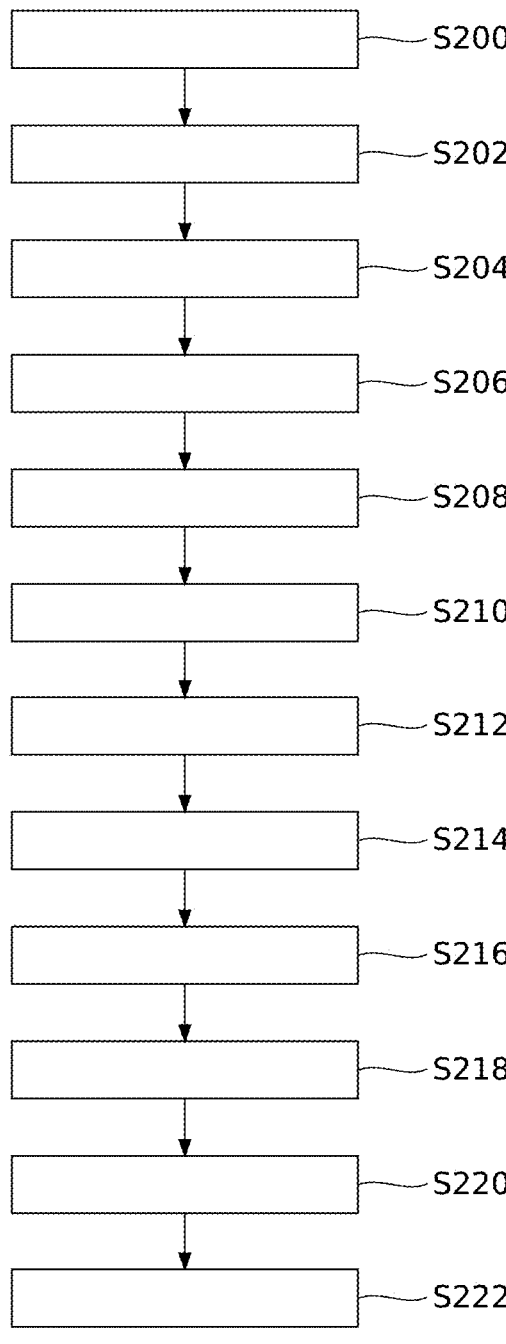
FIG. 2 is a flowchart of a method for imaging the sample with the imaging device illustrated in FIG. 1, according to some embodiments.

FIG. 2 is a flowchart of the method for imaging the sample 102 with the imaging device 100 according to FIG. 1.

The method may in particular be part of an experiment where possible changes in the first feature 104 and second feature 106 have a lower relevance for the experiment than changes in the third feature 108. In such an experiment, the first feature 104 and second feature 106 may already be well known and/or less interesting compared to the third feature 108. In such a case, the first feature 104 and the second feature 106 are used as a backdrop against which the changes in the third feature 108 are observed.

The process is started in step S200. In step S202 the first feature 104 and the second feature 106 are stained with the first fluorophore, and the third feature 108 is stained with the second fluorophore. In step S204 the controller 122 controls to excitation unit 110 to emit the first and second excitation light 111, thereby exciting the first fluorophore and the second fluorophore. The first and second excitation light 111 may be emitted concurrently or consecutively in any order. In step S206 the controller 122 controls the detection unit 112 to receive fluorescence light 120 from the excited fluorophores, for example by focusing the microscope objective 114 onto the sample 102. In step S208 the detection unit 112 separates the received fluorescence light 120 into the first spectral channel and the second spectral channel. In step 210 the controller 122 controls the detection unit 112 to generate the first fluorescence image 300 from the fluorescence light 120 detected by the first detector element 118a, and the second fluorescence image 600 from the fluorescence light 120 detected by the second detector element 118b. When the imaging device 100 is a widefield microscope, the first fluorescence image 300 and the second fluorescence image 600 are images captured by the first detector element 118a and the second detector element 118b, respectively, in a single imaging step. When the imaging device 100 is a scanning microscope, the first fluorescence image 300 and the second fluorescence image 600 are generated from the fluorescence emission signals generated in multiple successive imaging steps.

In step S212 the controller 122 performs an image segmentation in the first spectral channel based on a prior knowledge of the first feature 104 and the second feature 106. In this step, the first feature 104 and the second feature 106 are identified by known properties, for example by their shape and/or size. These known properties constitute the prior knowledge in this embodiment. The controller 122 may look up the known properties in a database that may be stored on the memory element 126 of the controller 122. The database may also be store on one or more remote memory elements and be accesses via a computer network. The controller 122 does not use machine learning algorithms to perform the image segmentation. Using known properties for image segmentation is faster, less computationally intensive, and does not require a training. The image segmentation may be performed on the first fluorescence image 300. Alternatively, the controller 122 performs the image segmentation on the fluorescence emission signals generated by the first detector element 118a. In the latter case, step S212 may be performed before the first fluorescence image 300 is generated in step S210.

Figure 4:
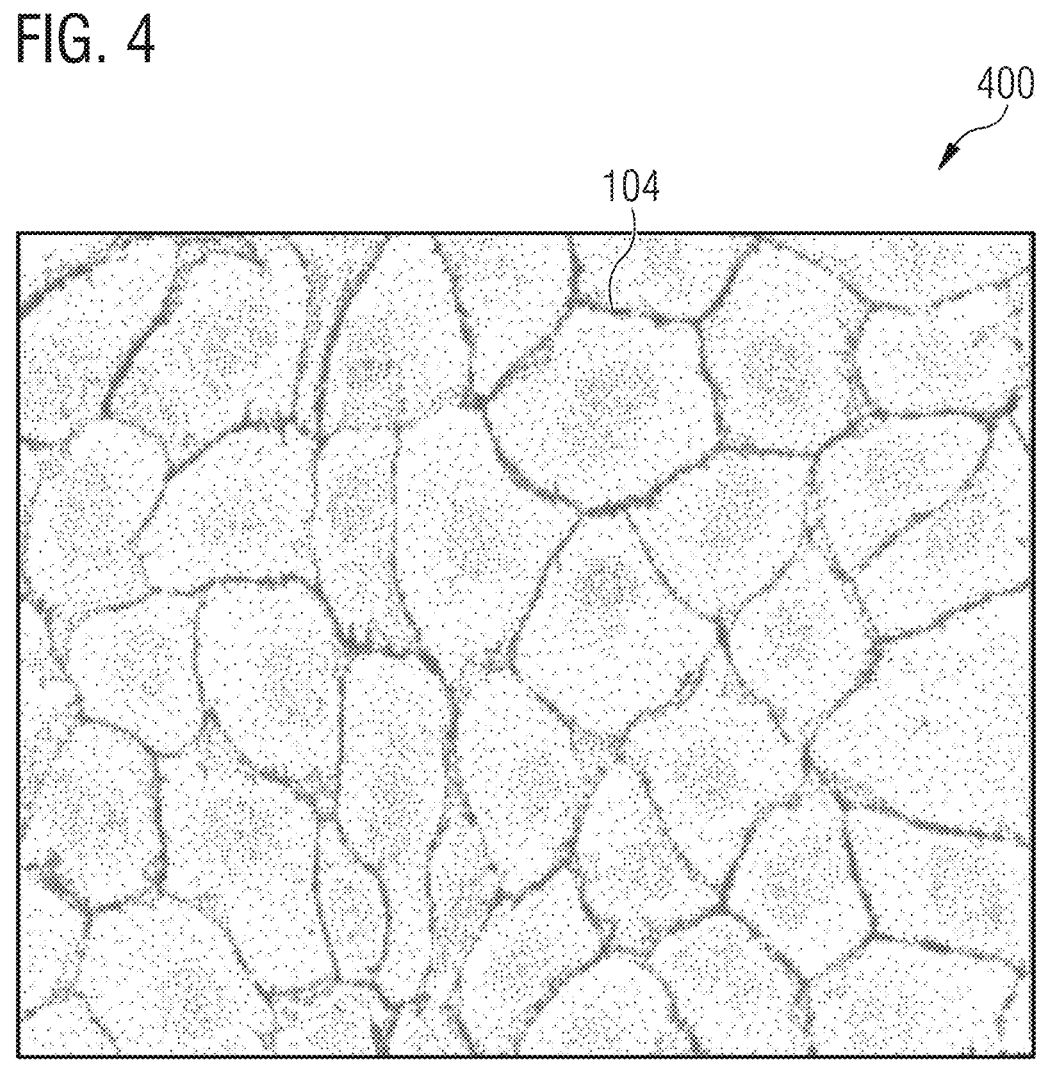

In step S214 the controller 122 determines the first image region 104' and the second image region 106' based on the image segmentation. The first image region 104' corresponds to the first feature 104, and the second image region 106' corresponds to the second feature 106. In step S216 the controller 122 generates a first image 400 (c.f. FIG. 4) based on the first image region 104' and a second image 500 (c.f.

Figure 5:
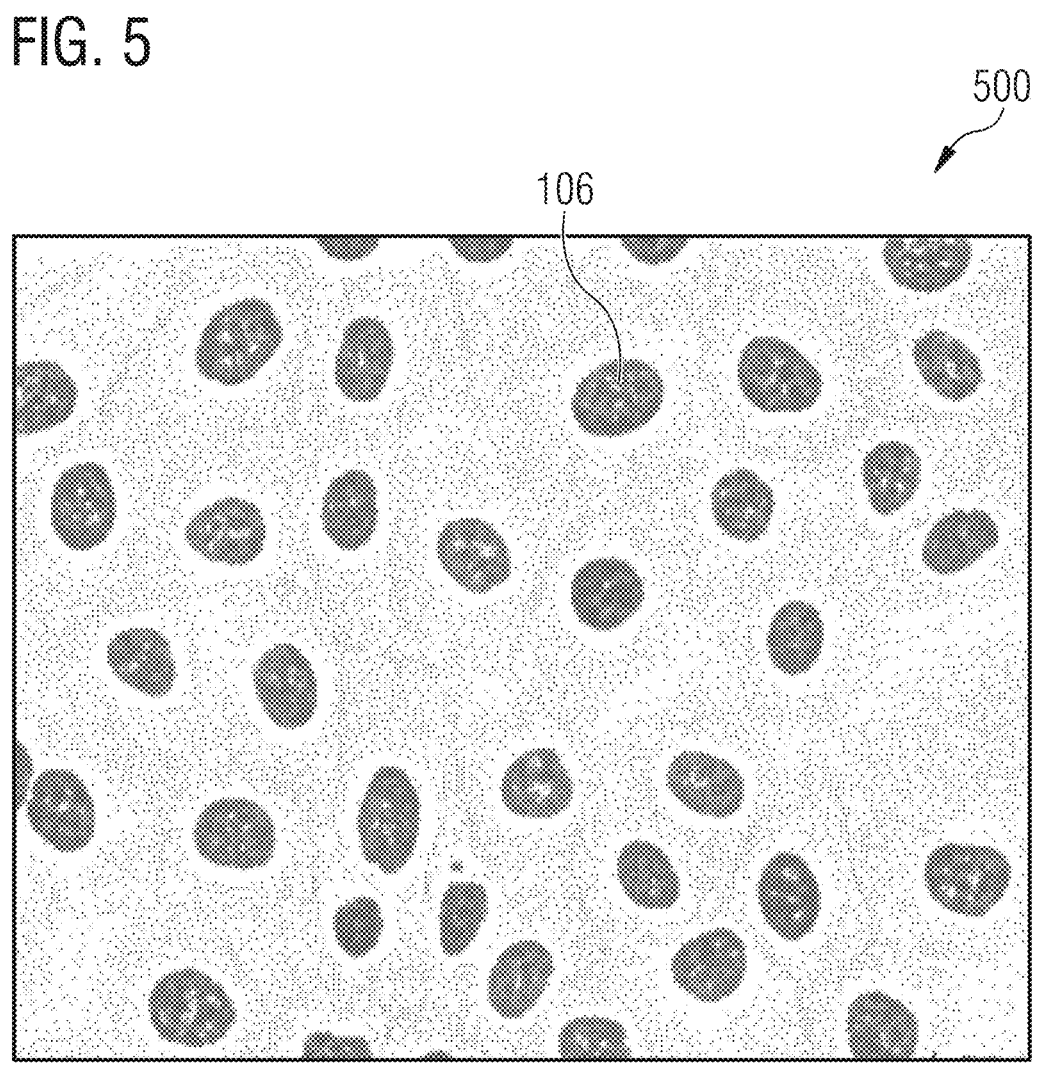
FIG. 5 is a schematic view of a second image region of the first fluorescence image according to FIG. 3.

FIG. 5) based the second image region 106'. The first image 400 shows the first feature 104 and will be described in more detail below with reference to FIG. 4. The second image 500 shows the second feature 106 and will be described in more detail below with reference to FIG. 5. The first image 400 and the second image 500 may be generated by the controller 122 as monochrome images or as false color images. Alternatively, or additionally, in step S216 the controller 122 generates the composite image 128 comprising at least the first image region 104' and the second image region 106'. The composite image 128 may also comprise the second fluorescence image 600 such that the composite image 128 shows the first feature 104, the second feature 106, and the third feature 108. In an optional step S218 the controller 122 determines a background region and removes the background region from the first image 400, the second image 500, the composite image 128, the first fluorescence image 300 and/or the second fluorescence image 600. In particular, the controller 122 assigns all fluorescence emission signals detected by the first detector element 118a that do not correspond to either the first feature 104 or the second feature 106 to the background region. In another optional step S220 the controller 122 displays the first fluorescence image 300, the second fluorescence image 600, the first image 400, the second image 500, and/or the composite image 128 to the user via the output unit 124. The process is ended in step S222.

FIG. 3 is a schematic view of a first fluorescence image 300 generated by the imaging device 100 according to FIG. 1.

The first fluorescence image 300 comprises pixels, each pixel corresponding to a fluorescence emission signal detected by the first detector element 118a. In FIG. 3, the first fluorescence image 300 has been inverted for clarity. This means that darker pixels correspond to stronger fluorescence emission signals. For the same reason, not all instances of the first feature 104 and the second feature 106 have been marked with reference signs in FIG. 3. The first detector element 118a only detects fluorescence light 120 emitted by the first fluorophore attached to first feature 104 and the second feature 106. Accordingly, as can be seen in FIG. 3, the first fluorescence image 300 comprises the first feature 104, exemplary shown as cell walls, and the second feature 106, exemplary shown as cell nuclei.

FIG. 4 is a schematic view of a first image region 104' of the first fluorescence image 300 according to FIG. 3.

The first image 400 has been generated by the controller 122 based on the first image region 104' and only shows the first feature 104, i.e. the cell walls. The first image 400 comprises the pixels of the first fluorescence image 300 corresponding to the first image region 104'. In FIG. 4, the first image 400 has been inverted for clarity. For the same reason, not all instances of the first feature 104 have been marked with reference signs in FIG. 4. While FIG. 4 is a monochrome image, the first image 400 may also be a false color image, preferably a false color image having a single color.

FIG. 5 is a schematic view of a second image region 106' of the first fluorescence image 300 according to FIG. 3.

The second image 500 has been generated by the controller 122 based on the second image region 106' and only shows the second feature 106, i.e. the cell nuclei. The second image 500 comprises the pixels of the first fluorescence image 300 corresponding to the second image region 106'. In FIG. 5, the second image 500 has been inverted for clarity. For the same reason, not all instances of the second feature 106 have been marked with reference signs in FIG. 3. While FIG. 5 is a monochrome image, the second image 500 may also be a false color image, preferably a false color image having a single color different from the single color of the first image 400.

FIG. 6 is a schematic view of a second fluorescence image 600 generated by the imaging device 100 according to FIG. 1.

The second fluorescence image 600 comprises pixels, each pixel corresponding to a fluorescence emission signal detected by the second detector element 118*b*. In FIG. 6, the second fluorescence image 600 has been inverted for clarity. For the same reason, not all instances of the third feature 108 have been marked with reference signs in FIG. 6. The second detector element 118*b* only detects fluorescence light 120 emitted by the second fluorophore attached to third feature 108. Accordingly, as can be seen in FIG. 3, the second fluorescence image 600 comprises the third feature 108, exemplary shown as organelles.

Figure 7:
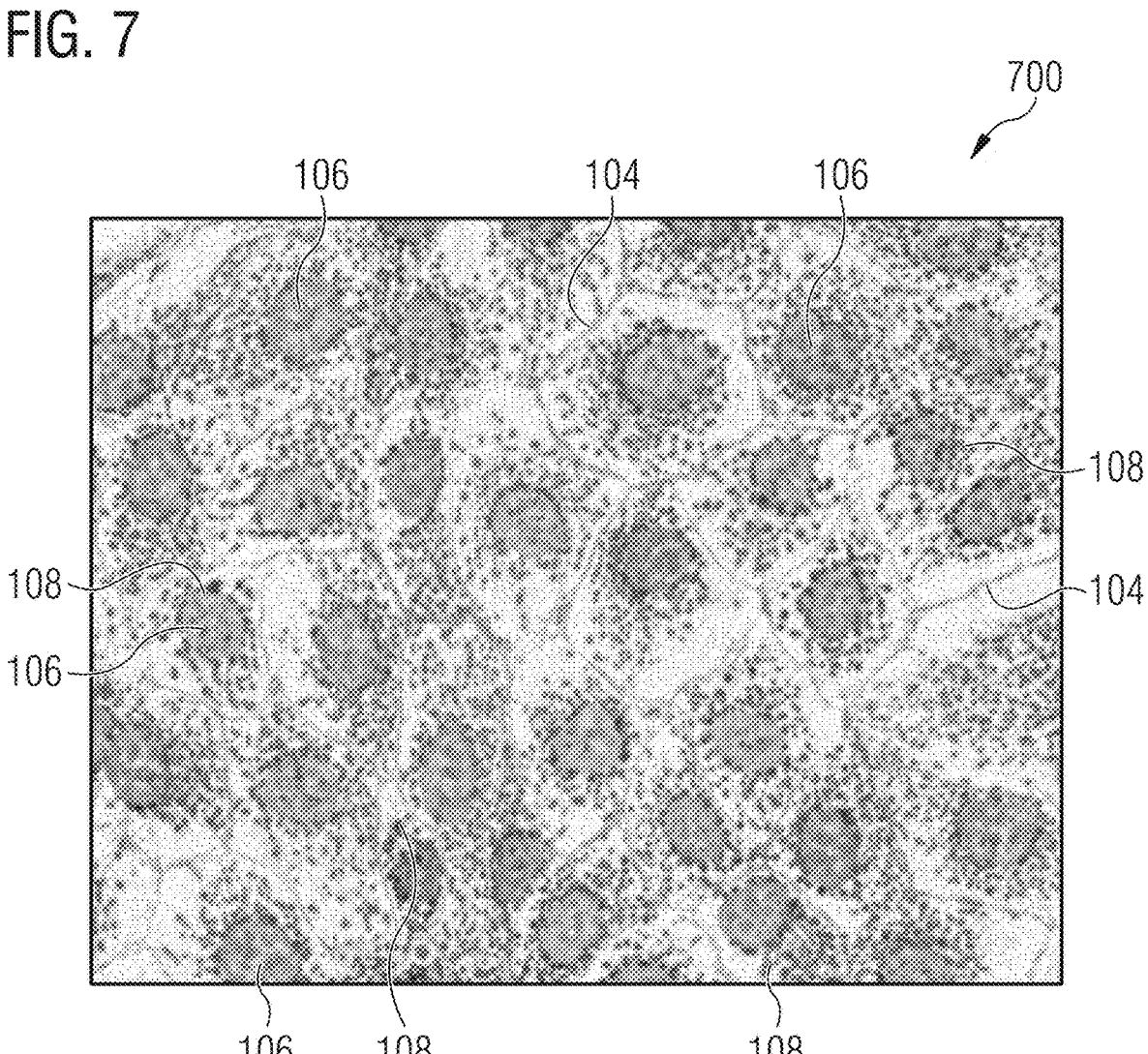
FIG. 7 is a schematic view of a composite image generated by the imaging device according to FIG. 1.

FIG. 7 is a schematic view of a composite image 700 generated by the imaging device 100 according to FIG. 1.

The composite image 700 has been generated by the controller 122 based on the first image region 104', the second image region 106', and the second fluorescence image 600. In other words, the composite image 700 shows the first feature 104, the second feature 106, and the third feature 108. In FIG. 7, the composite image 700 has been inverted for clarity. For the same reason, not all instances of the first feature 104, the second feature 106, and the third feature 108 have been marked with reference signs in FIG. 3. Although FIG. 7 is a monochrome image, the composite image 700 is preferably a false color image. For example, the first feature 104 may be shown in blue, the second feature 106 may be shown in red, and the third feature 108 may be shown in yellow.

Identical or similarly acting elements are designated with the same reference signs in all Figures. As used herein the term "and/or" includes any and all combinations of one or more of the associated listed items and may be abbreviated as "/". Individual features of the embodiments and all combinations of individual features of the embodiments among each other as well as in combination with individual features or feature groups of the preceding description and/or claims are considered disclosed.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments relate to a microscope comprising a system as described in connection with FIG. 1. Alternatively, a microscope may be part of or connected to a system as described in connection with FIG. 1. FIG. 1 shows a schematic illustration of a system 100 configured to perform a method described herein. The system 100 comprises a microscope 112 and a computer system 122. The microscope 112 is configured to take images and is connected to the computer system 122. The computer system 122 is config- ured to execute at least a part of a method described herein. The computer system 122 may be configured to execute a machine learning algorithm. The computer system 122 and microscope 112 may be separate entities but can also be integrated together in one common housing. The computer system 122 may be part of a central processing system of the microscope 112 and/or the computer system 122 may be part of a subcomponent of the microscope 112, such as a sensor, an actor, a camera or an illumination unit, etc. of the microscope 112.

The computer system 122 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 122 may comprise any circuit or combination of circuits. In one embodiment, the computer system 122 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), mul- tiple core processor, a field programmable gate array (FPGA), for example, of a microscope or a microscope component (e.g. camera) or any other type of processor or processing circuit. Other types of circuits that may be included in the computer system 122 may be a custom circuit, an application-specific integrated circuit (ASIC), or the like, such as, for example, one or more circuits (such as a communication circuit) for use in wireless devices like mobile telephones, tablet computers, laptop computers, two- way radios, and similar electronic systems. The computer system 122 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 122 may also include a display device, one or more speakers, and a keyboard and/or controller, which can include a mouse, trackball, touch screen, voice-recognition device, or any other device that permits a system user to input information into and receive information from the computer system 122.

Some or all of the method steps may be executed by (or using) a hardware apparatus, like for example, a processor, a microprocessor, a programmable computer or an electronic circuit. In some embodiments, some one or more of the method steps may be executed by such an apparatus.

Depending on certain implementation requirements, embodiments of the invention can be implemented in hard- ware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically read- able control signals stored thereon, which cooperate (or are capable of cooperating) with a programmable computer system such that the respective method is performed. There- fore, the digital storage medium may be computer readable.

Some embodiments comprise a data carrier having elec- tronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Imaging device
102 Sample
104, 106, 108 Feature
104', 106' Image region
110 Excitation unit
111 Excitation light
112 Detection unit
114 Microscope objective
116 Beam splitter
118a, 118b Detector element
120 Fluorescence light
122 Controller
124 Output unit
126 Memory element
128 Composite image
300, 400, 500, 600, 700 Image

The invention claimed is:

1. An imaging device for imaging a sample, the imaging device comprising:
   an excitation unit configured to emit excitation light for exciting a first fluorophore attached to a first feature of the sample and at least a second feature of the sample;
   a detection unit configured to:
      receive fluorescence light from the first fluorophore, and
      generate at least one fluorescence image from the received fluorescence light; and
   a controller configured to:
      determine, based on an image segmentation, a first image region of the fluorescence image corresponding to the first feature and a second image region of the fluorescence image corresponding to the second feature,
      generate a first image based on the first image region and a second image based on the second image region, and/or generate a composite image comprising at least the first image region and the second image region.

2. The imaging device according to claim 1, wherein the controller is configured to perform the image segmentation based on a prior knowledge of the first feature and/or the second feature.

3. The imaging device according to claim 1, wherein the detection unit is configured to detect a plurality of fluorescence emission signals from the received fluorescence light, and wherein the controller is configured to perform the image segmentation by assigning each of the plurality of fluorescence emission signals selectively to the first image region associated with the first feature or the second image region associated with the second feature.

4. The imaging device according to claim 3, wherein the fluorescence image comprises pixels, each pixel corresponding to one or more of the plurality of fluorescence emission signals, and wherein the controller is configured to determine, based on the image segmentation, pixels of the fluorescence image corresponding to the first image region, and pixels of the fluorescence image corresponding to the second image region.

5. The imaging device according to claim 1, wherein the first image and the second image are false color images, and wherein the first image has a first color, and the second image has a second color different from the first color.

6. The imaging device according to claim 1, wherein the composite image is a false color image, and wherein the first image region in the composite image has a first color, and the second image region in the composite image has a second color different from the first color.

7. The imaging device according to claim 1, wherein:
the excitation unit is further configured to emit second excitation light for exciting a second fluorophore attached to a third feature of the sample, and
the detection unit is configured to:
separate the received fluorescence light into at least two spectral channels, a first spectral channel corresponding to a first wavelength band comprising at least a part of an emission spectrum of the first fluorophore, and a second spectral channel corresponding to a second wavelength band comprising at least a part of an emission spectrum of the second fluorophore;
generate a first fluorescence image based on fluorescence light received in the first spectral channel; and
generate a second fluorescence image based on fluorescence light received in the second spectral channel.

8. The imaging device according to claim 7, wherein the detection unit comprises at least two detector elements, and a beam splitter that is configured to direct received fluorescence light having a wavelength in the first wavelength band onto a first detector element, and to direct received light having a wavelength in the second wavelength band onto a second detector element.

9. The imaging device according to claim 7, wherein the controller is configured to generate the composite image comprising the first image region, the second image region, and the second fluorescence image, wherein the first image region has a first color, the second image region has a second color different from the first color, and the second fluorescence image has a third color, the third color being different from the first color and the second color.

10. The imaging device according to claim 1, wherein the controller is configured to determine a background region of the fluorescence image based on at least the first image region and the second image region, and to remove the background region from the first image, the second image, and/or the composite image, and the fluorescence image.

11. The imaging device according to claim 1, wherein the imaging device is a microscope.

12. A method for imaging a sample, the method comprising:
exciting a first fluorophore attached to a first feature of the sample and at least a second feature of the sample;
receiving fluorescence light from the first fluorophore, and generating at least one fluorescence image from the received fluorescence light;
determining, based on an image segmentation, a first image region of the fluorescence image corresponding to the first feature and a second image region of the fluorescence image corresponding to the second feature; and
generating a first image based on the first image region and a second image based the second image region, and/or generating a composite image comprising at least the first image region and the second image region.

13. The method according to claim 12, further comprising:
staining the first feature and the second feature with the first fluorophore, and staining a third feature with a second fluorophore;
separating the received fluorescence light into at least two spectral channels, a first spectral channel corresponding to a first wavelength band comprising at least a part of an emission spectrum of the first fluorophore, and a second spectral channel corresponding to a second wavelength band comprising at least a part of an emission spectrum of the second fluorophore; and
generating a first fluorescence image based on fluorescence light received in the first spectral channel, and generating a second fluorescence image based on fluorescence light received in the second spectral channel.

14. The method according to claim 13, wherein the method is part of an experiment, wherein changes in the first feature and second feature have a lower relevance for the experiment than changes in the third feature.

15. A non-transitory computer-readable medium having program steps stored thereon, the program steps, when executed by a computer processor, causing performance of a method for imaging a sample, the method comprising:
exciting a first fluorophore attached to a first feature of the sample and at least a second feature of the sample;
receiving fluorescence light from the first fluorophores, and generating at least one fluorescence image from the received fluorescence light;
determining, based on an image segmentation, a first image region of the fluorescence image corresponding to the first feature and a second image region of the fluorescence image corresponding to the second feature; and
generating a first image based on the first image region and a second image based the second image region, and/or generating a composite image comprising at least the first image region and the second image region.

* * * * *